United States Patent [19]
Patterson

[11] Patent Number: 5,940,252
[45] Date of Patent: Aug. 17, 1999

[54] DUAL-LEAD FLEX CIRCUIT FOR A ROTARY ACTUATOR

[76] Inventor: Robert S. Patterson, 2703 Hill Dr., Ogden, Utah 84403

[21] Appl. No.: 08/924,714

[22] Filed: Aug. 29, 1997

[51] Int. Cl.⁶ .......................... G11B 21/08; G11B 25/08; G11B 33/12
[52] U.S. Cl. ........................ 360/106; 360/97.01; 360/108
[58] Field of Search ................................... 360/106, 104, 360/108, 97.01

[56] References Cited

U.S. PATENT DOCUMENTS

| | | | |
|---|---|---|---|
| 5,325,252 | 6/1994 | Yagi et al. | 360/106 |
| 5,701,220 | 12/1997 | Koriyama | 360/106 |
| 5,717,541 | 2/1998 | Ycas et al. | 360/106 |
| 5,745,326 | 4/1998 | Koriyama | 360/106 |
| 5,748,410 | 5/1998 | Briggs et al. | 360/106 |

OTHER PUBLICATIONS

U.S. application No. 08/866,190, Briggs et al., filed May 31, 1997.

*Primary Examiner*—Craig A. Renner
*Attorney, Agent, or Firm*—Woodcock Washburn Kurtz Mackiewicz & Norris LLP

[57] ABSTRACT

A disk drive conducts signals between read/write heads of a rotor assembly and an electrical circuit board and supplies power to an actuator coil. The disk drive comprises a rotor assembly, a magnetic motor having an actuator coil for rotating the rotor assembly and heads into and out of engagement with a rotating storage medium, an electrical circuit board for supplying electrical signals to the heads and for receiving electrical signals from the heads, and a dual-lead flex circuit for conducting signals between the heads and the electrical circuit board and for supplying power to the actuator coil. The rotor assembly comprises a first extension, a second extension, and a pivot, while the heads are mounted on the rotor assembly. The flex circuit has a static portion from which a first lead and a second lead emanate. The first lead has a substantially L-shaped configuration and in part is integral with the static portion making electrical contact with the electrical circuit board and in part is mounted on the first extension of the rotor assembly. The second lead has a substantially L-shaped configuration and in part is integral with the static portion making electrical contact with the electrical circuit board and in part is mounted on the second extension of the rotor assembly such that both leads extend parallel to each other from their respective extensions on the rotor assembly and the second lead does not interfere with the first lead.

3 Claims, 3 Drawing Sheets

DUAL-LEAD FLEX CIRCUIT FOR A ROTARY ACTUATOR

RELATED APPLICATIONS

The present invention is related by subject matter to the inventions disclosed in commonly assigned application having Ser. No. 08/749,999, filed on Nov. 15, 1997, entitled "Slotted Flex Circuit and Outer Return Path for a Disk Drive Actuator" and in commonly assigned application having Ser. No. 08/866,190, filed on May 30, 1997, entitled "Dual Loop Flex Circuit for a Linear Actuator."

FIELD OF THE INVENTION

The present invention relates to data storage devices, or disk drives, for storing digital information, and more particularly, to a flex circuit having two dynamic leads for a rotary actuator of a disk drive.

BACKGROUND OF THE INVENTION

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Digital cameras and other hand-held devices have relatively small bays in which to mount internal disk drives and other peripheral devices, as compared to the much larger bays available in most workstation and personal computer housings or even those found in laptop and notebook computers. The relatively small size of peripheral bays found in such hand-held devices can place significant constraints on the designer of internal disk drives for use in such devices. Techniques that address and overcome the problems associated with these size constraints are therefore important.

Disk drives often employ rotary actuators for positioning read/write heads of the disk drive over the surfaces of rotating storage media. Rotary actuators are used to carry the heads for magnetic disk drives, CD players, and optical drive devices. A rotary actuator has a pivot on bearings about which the actuator rotates to position the heads onto the desired track of the rotating storage medium. Magnetic flux for a rotary actuator is typically generated by its magnetic circuit comprising a return path assembly, a pair of magnets, and an actuator coil.

Typically, a flex circuit having a single dynamic lead is attached to a rotary actuator to (1) supply current to the actuator coil and (2) carry signals between the heads and an electric circuit board. One drawback of a single-lead flex circuit is that it is unnecessarily wide because it carries both the current supplied to the coil and the signals to and from the read/write heads on the same lead. Thus, it is desirable to provide a flex circuit for a rotary actuator that does not require as much vertical space as a single-lead flex circuit.

A common problem with carriage assemblies utilizing single-lead flex circuits is that the signals carried to and from the read/write heads are subject to electrical or induced noise from the line of current supplied to the coil. The relatively large amount of current supplied to the actuator coil creates a magnetic field around the wire carrying the current, resulting in induced noise that interferes with the relatively small electrical signals to and from the read/write heads. Because the current supplied to the coil and the signals to and from the heads are adjacent to each other in a single-lead flex circuit, induced noise is a substantial problem, especially where space is limited. Thus, it is desirable to provide a flex circuit for a rotary actuator that minimizes the induced noise that the line of current supplied to the coil imparts on the signals to and from the read/write heads.

One drawback with flex circuits for rotary actuators is that they take up valuable space adjacent to the circuit board on which they are mounted. Thus, it is desirable to provide a flex circuit for a rotary actuator that provides room for other flex circuit components to be mounted on the circuit board.

Another drawback with flex circuits for rotary actuators is that their design often requires the use of solder pads on both the top and bottom sides of the flex circuit. Such flex circuits are considerably more expensive to manufacture. Thus, in an effort minimize production costs, it is desirable to provide a flex circuit for a rotary actuator that does not require the use of solder pads on both the top and bottom sides of the flex circuit.

SUMMARY OF THE INVENTION

A disk drive for conducting signals between read/write heads of a rotary actuator and an electrical circuit board and for supplying power to an actuator coil is provided. The disk drive comprises a rotor assembly, a magnetic motor having an actuator coil for rotating the actuator and heads into and out of engagement with a rotating storage medium, an electrical circuit board for supplying electrical signals to the heads and for receiving electrical signals from the heads, and a flex circuit for conducting signals between the heads and the electrical circuit board and for supplying power to the actuator coil.

The rotor assembly comprises a first extension, a second extension, and a pivot, while the heads are mounted on the actuator. The flex circuit has a static portion from which a first lead and a second lead emanate. The first lead has a substantially L-shaped configuration and in part is integral with the static portion making electrical contact with the electrical circuit board and in part is mounted on the first extension of the actuator. The second lead has a substantially L-shaped configuration and in part is integral with the static portion making electrical contact with the electrical circuit board and in part is mounted on the second extension of the actuator such that both leads extend parallel to each other from their respective extensions on the rotor assembly and the second lead does not interfere with the first lead.

In the preferred embodiment of the present invention, the first lead of the dual-lead flex circuit conducts the signals between the read/write heads and the electrical circuit board and the second lead supplies power to the actuator coil.

DETAILED DESCRIPTION OF THE PREFERRED EMBODIMENTS

Figure 1:
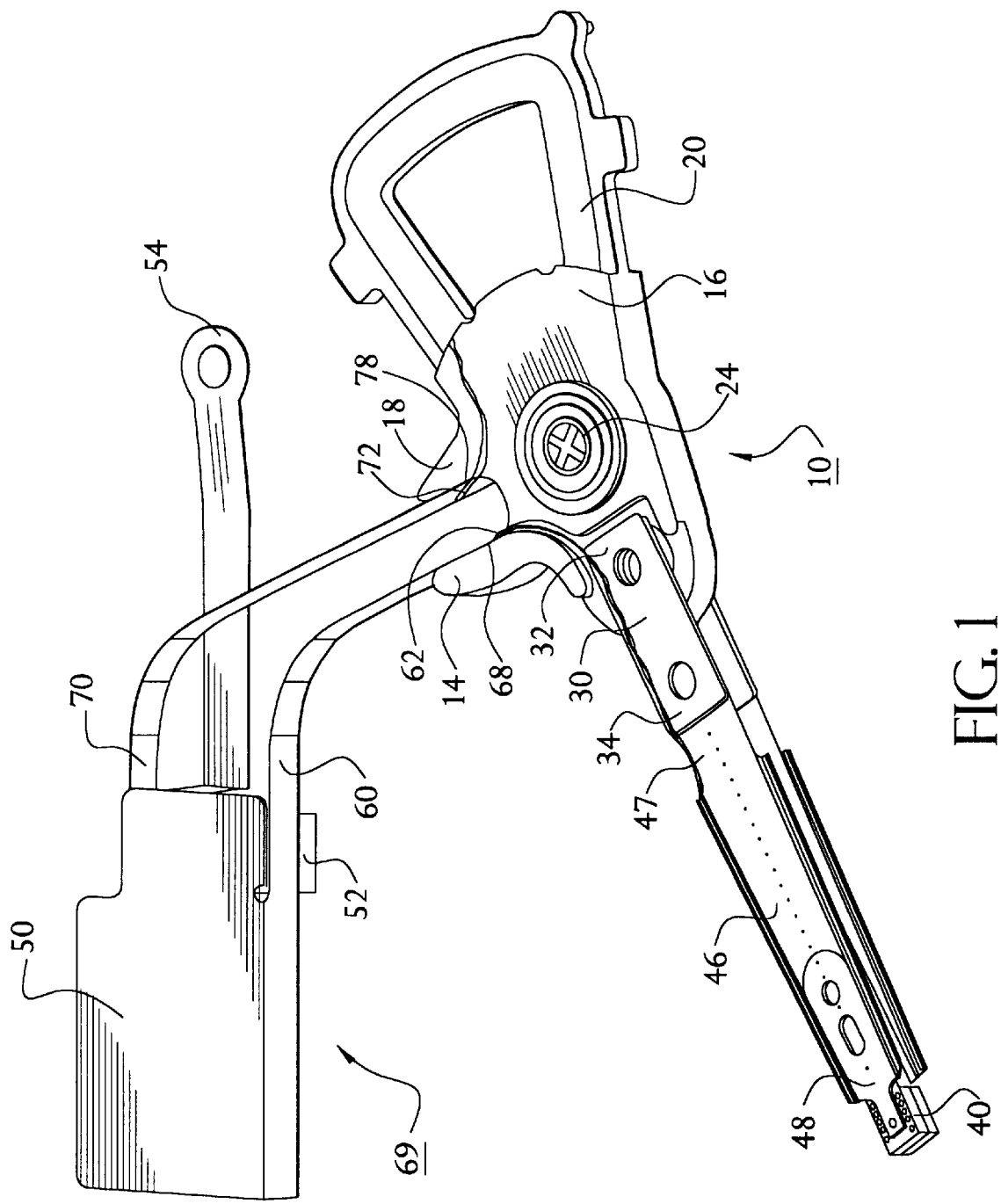
FIG. 1 is a perspective view of a rotary actuator in cooperation with the preferred embodiment of the dual-lead flex circuit.

Referring to the drawings, there is shown in FIG. 1 a perspective view of a rotary actuator 10 in cooperation with the preferred embodiment of the dual-lead flex circuit 65 according to the present invention. The actuator 10 comprises a rotor assembly 16 having a left extension 14 and a right extension 18, an actuator coil 20, a pivot 24, an extended base plate 30 having a proximal end 32 and a distal end 34, load beams 46 having a proximal end 47 and a distal end 48, and read/write heads 40.

The actuator coil 20 is part of and preferably molded as an extension of the rotor assembly 16. The proximal end 32 of the base plate 30 is attached to the rotor assembly 16, the proximal end 47 of the load beams 46 are attached to the distal end 34 of the base plate 30, and the read/write heads 40 are attached to the distal end 48 of the load beams 46. The rotor assembly 16, the base plate 30, the load beams 46, and the heads 40 all rotate about the pivot 24 as the rotor assembly 16 rotates to engage various tracks of the storage medium.

The preferred embodiment of the dual-lead flex circuit 65 comprises a static portion 50, a connector 52, a ground 54, a first (left) lead 60 and a second (right) lead 70, each connected to their respective extensions 14 and 18 of the rotor assembly 16 (the terms "left" and "right" are used throughout this specification for illustrative purposes only and are not meant to limit the scope of the claimed invention in any way). As the rotor assembly 16 rotates to engage various tracks of the storage medium, the leads 60 and 70 flex between the static portion 50 of the flex circuit 65 and the rotor assembly 16 which rotates about the pivot 24. During rotation, the leads 60 and 70 maintain a substantially L-shaped configuration, i.e., having only one bend of an angle typically greater than 90 degrees.

Figure 2:
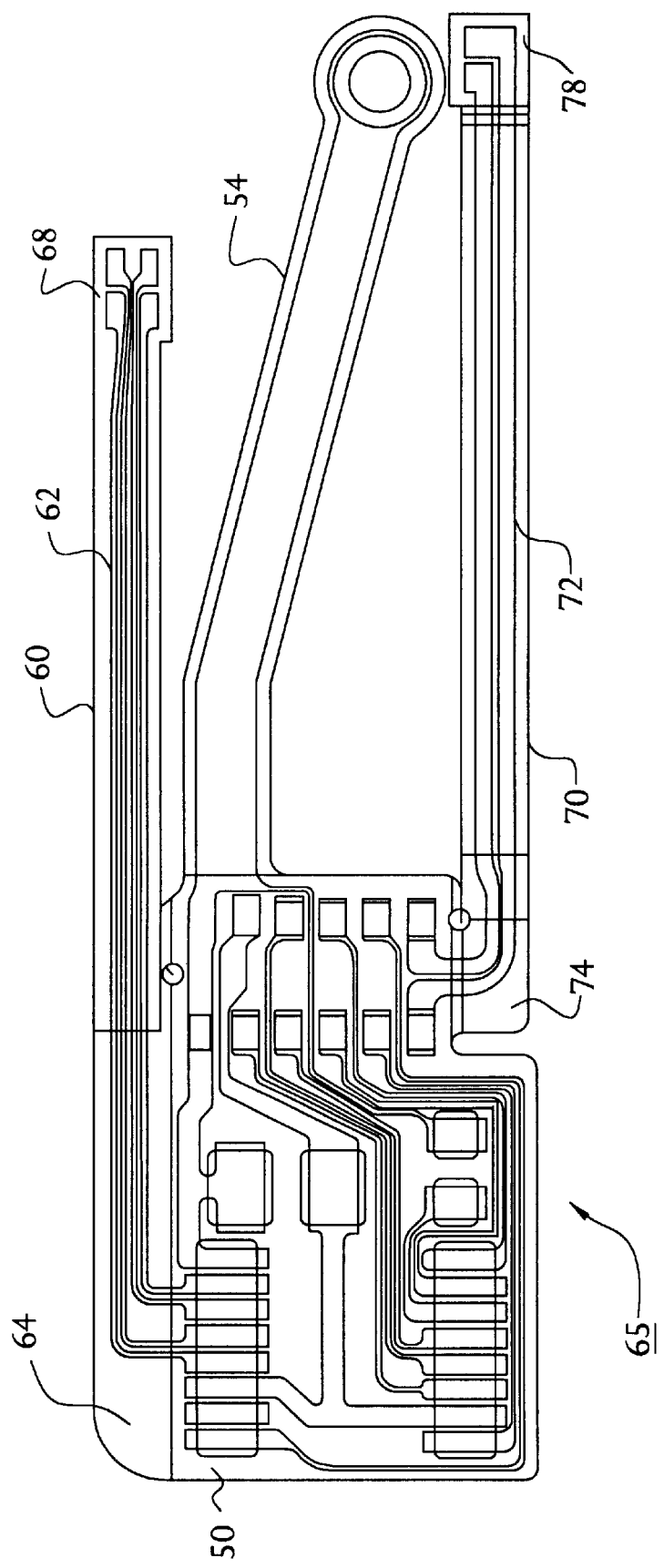
FIG. 2 is a t race diagram for the preferred embodiment of the dual-lead flex circuit.
Figure 3:
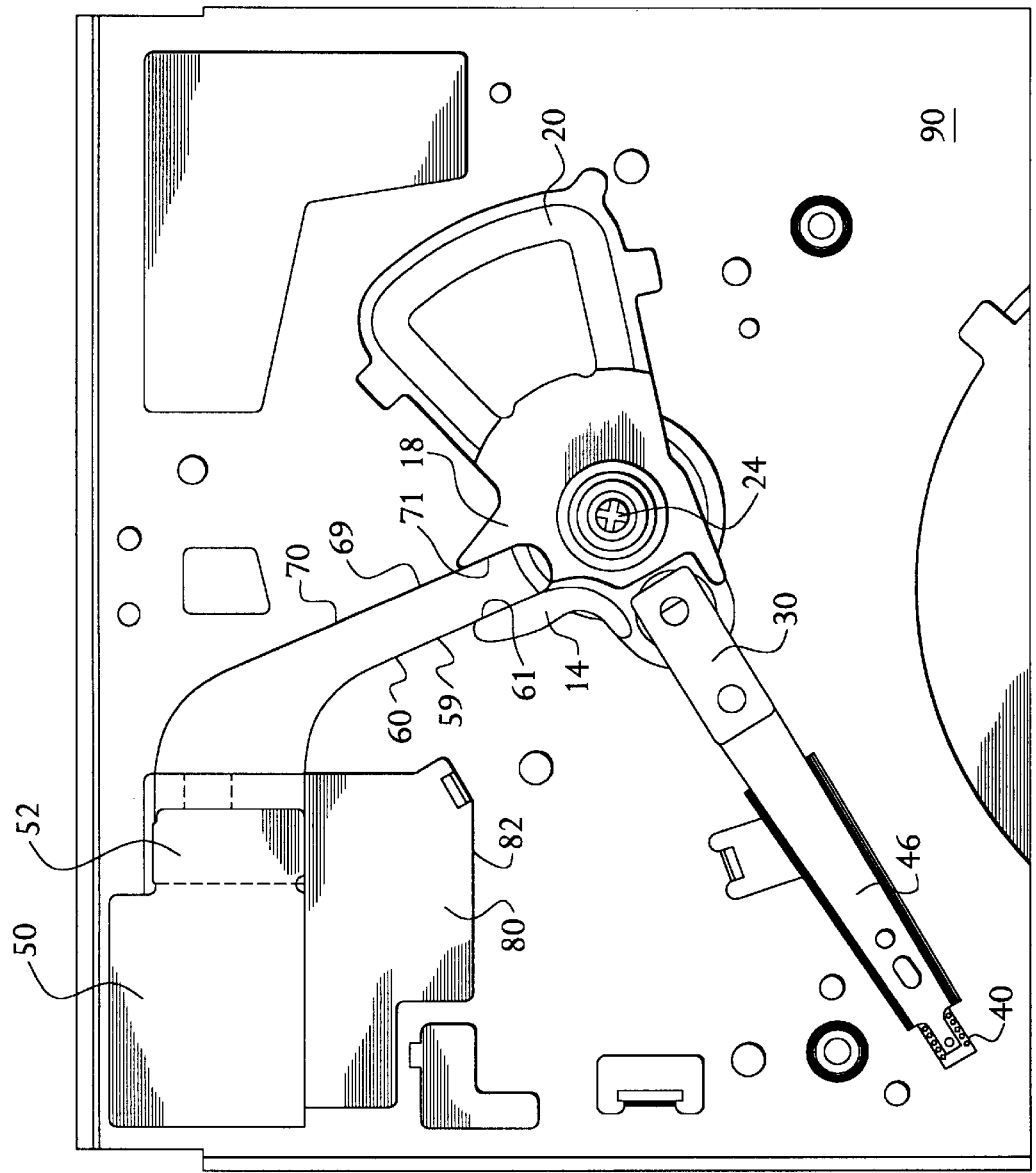
FIG. 3 is a plan view of the preferred embodiment of the dual-lead flex circuit in cooperation with a rotary actuator and a section of a chassis of a rotary disk drive.

FIG. 2 shows a trace diagram for the preferred embodiment of the dual-lead flex circuit 65. FIG. 3 shows a plan view of the preferred embodiment of the dual-lead flex circuit 65 in cooperation with a rotary actuator and a section of a chassis of an exemplary rotary disk drive.

Referring to FIGS. 1–3, the left lead 60 comprises left solder pads 68, a left connecting section 64 for connecting the left lead 60 to the static portion 50 of the flex circuit 65, and signals on traces 62 going to and from the read/write heads 40. The left solder pads 68 located on the opposite side 59 of the left lead 60 are attached to the left extension 14 at 61. From the left solder pads 68, the signals on traces 62 extend to the read/write heads 40 by way of the base plate 30 and the load beams 46.

Similarly, the right lead 70 comprises right solder pads 78, a right connecting section 74 for connecting the right lead 70 to the static portion 50 of the flex circuit 65, and traces 72 going to and from the actuator coil 20. The right solder pads 78 located on the opposite side 69 of the right lead 70 are attached to the right extension 18 at 71. From the right solder pads 78, the traces 72 connect to the actuator coil 20.

One advantage of the dual-lead flex circuit 65 is the separation of the lines of current 72 to the actuator coil 20 from the signals on traces 62 to and from the read/write heads 40. Because the current on the power lines 72 to the actuator coil 20 travels on the right lead 70 and the signals on traces 62 to and from the read/write heads 40 travel on the left lead 60, the induced noise from the current on lines 72 supplied to the coil 20 that interferes with the signals on traces 62 to and from the read/write heads 40 is minimized.

Another advantage of the dual-lead flex circuit 65 is that it is not as wide as a single-lead flex circuit. A single-lead flex circuit that carries both the current on lines 72 supplied to the coil 20 and the signals on traces 62 to and from the read/write heads 40 on the same loop has a minimum width of approximately 3.0 mm. Each side of the dual-lead flex circuit, however, is only about 1.5 mm wide. This reduction in width of approximately 1.5 mm is significant considering the height restrictions on a drive suitable for hand-held devices is only approximately 5 mm. Thus, the dual-lead flex circuit 65 of the present invention does not require as much vertical space as a single-lead flex circuit.

Another advantage of the dual-lead flex circuit of the present invention lies in the orientation of static portion 50 of the flex circuit 65 in its connection to the circuit board 80. As shown in FIG. 2, the static portion 50 of the flex circuit 65 is situated above the electronic circuit board 80. The circuit board 80 is located below the chassis 90 and exposed to the flex circuit 65 by means of a hole 82 in the chassis 90.

The static portion 50 is attached to the circuit board 80 by means of a connector 52, which also serves to effect electrical contact between the static portion 50 of the flex circuit 65 and the circuit board 80. Thus, the static portion 50 is cantilevered over the chassis 90 and the electrical components of the flex circuit 65 hang down from the underside of the static portion 50. Thus, with this design, the present invention provides room for other components to be mounted on the circuit board 80 in a space that would otherwise be occupied by the static portion 50 of the flex circuit 65.

It should be noted that the connector 52 serves to provide the necessary distance between the static portion 50 and the circuit board 80 and that it specifically is not required to perform this function. An embodiment of the present invention without a connector 52 is possible. For example, in such an embodiment, the static portion 50 of the flex circuit 65 has an extension near the location of the connector 52 which projects down to meet the circuit board 80. This extension is then soldered directly to the circuit board 80 or attached to the chassis 90, thus replacing the connector 52.

One advantage of the dual-lead flex circuit 65 lies in the orientation of the two leads as they connect to the rotor assembly 16. The flex circuit 65 is attached to the extensions 14 and 18 of the rotor assembly 16 and both leads 60 and 70 extend parallel to each other from their respective extensions 14 and 18 on the rotor assembly 16 and are substantially radial (as opposed to tangential) in their orientation to the pivot 24.

The orientation of the leads 60 and 70 at both the static portion 50 of the flex circuit 65 and at the rotor assembly 16 allows the leads 60 and 70 to flex while maintaining separation between the two during rotation of the rotor assembly 16. For example, if the leads 60 and 70 were separated only slightly, being connected substantially tangential to the rotor assembly 16 on the same side of the pivot 24, then the leads 60 and 70 would interfere or make contact with each other during rotation of the rotor assembly 16.

This orientation is also effective in minimizing the horizontal space required for the two dynamic leads 60 and 70 during rotation of the rotor assembly 16. For example, if the leads 60 and 70 were connected substantially tangential to the rotor assembly 16 on opposite sides of the pivot 24, then the flexing of the leads 60 and 70 would require more horizontal space in the disk drive. As shown in FIG. 3, leads 60 and 70 are substantially perpendicular to the rotor assembly 16 such that the leads 60 and 70 extend linearly from their respective extensions 14 and 18. Thus, the orientation of the leads 60 and 70 as they connect to their respective extensions 14 and 18 of the rotor assembly 16 help minimize the amount of interference between the leads 60 and 70, while at the same time, minimizing the amount of horizontal space that is needed during rotation of the rotor assembly 16.

Another advantage of the dual-lead flex circuit 65 which lies in the orientation of the two leads as they connect to the rotor assembly 16 is that this design allows for the solder pads 68 and 78, as well as those required for mounting the electrical components on the static portion 50 of the flex circuit 65, on only one side (side with the static portion 50 facing the chassis 90) of the flex circuit 65. Thus, the design of the present invention minimizes manufacturing costs in that it provides a dual-lead flex circuit 65 for a rotary actuator 10 that only requires solder pads on only one side of the flex circuit 65.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A disk drive comprising:

a rotary actuator for carrying read/write heads into engagement with a storage medium, the actuator comprising:

a rotor assembly having a main body rotatable about a pivot, a first extension extending outwardly from said main body, and a second extension extending outwardly from said main body, the heads being mounted to said rotor assembly; and a magnetic motor for rotating said rotor assembly and heads into and out of engagement with the medium, said magnetic motor including an actuator coil mounted on said rotor assembly;

an electrical circuit board for supplying electrical signals to the heads and for receiving electrical signals from the heads; and a flex circuit for conducting signals between the heads and the electrical circuit board and for supplying power to the actuator coil, said flex circuit having a static portion from which a first lead and a second lead emanate, the first lead in part integral with the static portion making electrical contact with said electrical circuit board and in part mounted on the first extension of said rotor assembly, the second lead in part integral with the static portion making electrical contact with said electrical circuit board and in part mounted on the second extension of said rotor assembly such that both leads extend substantially linearly and parallel to each other from their respective extensions on the rotor assembly and the second lead does not interfere with the first lead.

2. The disk drive of claim 1, wherein the first lead of said flex circuit conducts the signals between the heads and said electrical circuit board and the second lead of said flex circuit supplies power to said coil.

3. The disk drive of claim 1, wherein each lead of said flex circuit has a substantially L-shaped configuration.

* * * * *